US012254640B2

(12) United States Patent
Ogawa (10) Patent No.: US 12,254,640 B2
(45) Date of Patent: Mar. 18, 2025

(54) OBJECT TRACKING DEVICE, OBJECT TRACKING METHOD, AND RECORDING MEDIUM (71) Applicant: NEC Corporation, Tokyo (JP)

(72) Inventor: Takuya Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 387 days.

(21) Appl. No.: 17/910,276

(22) PCT Filed: Mar. 16, 2020

(86) PCT No.: PCT/JP2020/011390
§ 371 (c)(1),
(2) Date: Sep. 8, 2022

(87) PCT Pub. No.: WO2021/186494
PCT Pub. Date: Sep. 23, 2021

(65) Prior Publication Data
US 2023/0120093 A1 Apr. 20, 2023

(51) Int. Cl.
G06K 9/00 (2022.01)
G06T 7/20 (2017.01)
(Continued)

(52) U.S. Cl.
CPC .............. G06T 7/20 (2013.01); G06V 10/25 (2022.01); G06V 10/761 (2022.01); G06V 2201/07 (2022.01)

(58) Field of Classification Search
None
See application file for complete search history.

(56) References Cited

U.S. PATENT DOCUMENTS 8,144,934 B2 * 3/2012 Abe .................. G01S 3/7864
382/107
8,379,095 B2 * 2/2013 Lee .................. H04N 23/68
382/107

(Continued)

FOREIGN PATENT DOCUMENTS

JP 2011-059897 A 3/2011
JP 2014-186496 A 10/2014
(Continued)

OTHER PUBLICATIONS

International Search Report for PCT Application No. PCT/JP2020/011390, mailed on Jun. 16, 2020.

Primary Examiner — SJ Park
(74) Attorney, Agent, or Firm — Sughrue Mion, PLLC (57) ABSTRACT In an object tracking device, the extraction means extracts target candidates from images in a time-series. The first setting means sets a first search range based on frame information and reliability of a target in a previous image in the time-series. The tracking means searches the target from the target candidates extracted within the first search range using the reliability indicating similarity to a target model, and tracks the target. The second setting means sets a second search range which includes the first search range and which is larger than the first search range. The model updating means updates the target model using the target candidates extracted within the first search range and the target candidates extracted within the second search range.

10 Claims, 9 Drawing Sheets (51) Int. Cl.
  *G06V 10/25* (2022.01)
  *G06V 10/74* (2022.01)

(56) References Cited

U.S. PATENT DOCUMENTS

2010/0214407 A1* 8/2010 Abe .......................... G06T 7/74
    348/222.1
2018/0220055 A1* 8/2018 Omori .................... G06V 10/10

FOREIGN PATENT DOCUMENTS

| JP | 2017-156886 A | 9/2017 |
| JP | 2018-112890 A | 7/2018 |
| JP | 2019-075051 A | 5/2019 |

* cited by examiner

OBJECT TRACKING DEVICE, OBJECT TRACKING METHOD, AND RECORDING MEDIUM

This application is a National Stage Entry of PCT/JP2020/011390 filed on Mar. 16, 2020, the contents of all of which are incorporated herein by reference, in their entirety.

TECHNICAL FIELD

The present invention relates to a technique for tracking an object contained in an image.

BACKGROUND ART

There is known an object tracking technique which detects a specific object in a moving image as a target and tracks the movement of the target in the image. In object tracking, a feature of a target in an image is extracted and an object having a similar feature is tracked as the target.

Patent Document 1 describes an object tracking method in consideration of overlap of objects. Also, Patent Document 2 discloses a device for estimating the attitude of an object in the image, wherein the device cuts out the image area near the local feature of the object in the initial frame of the captured image as a positive sample, cuts out the image area other than the local feature as a negative sample, and trains an identification model for calculating the similarity of the local features using them.

PRECEDING TECHNICAL REFERENCES

Patent Document

Patent Document 1: Japanese Patent Application Laid-Open under No. 2018-112890
Patent Document 2: Japanese Patent Application Laid-Open under No. 2014-186496

SUMMARY

Problem to be Solved by the Invention

One problem in object tracking technology is the phenomenon of "transfer". This refers to such a phenomenon that, when a target and a similar object similar to the target appears during tracking of the target and overlapping or shielding occurs between the target and the similar object, the object tracking device mistakenly tracks the similar object as the target thereafter. Once transfer occurs, it becomes very difficult to return to the correct target because the object tracking device learns the feature of the similar object and continues to track the similar object thereafter.

It is one object of the present invention to prevent transfer in object tracking.

Means for Solving the Problem

According to an example aspect of the present invention, there is provided an object tracking device comprising:
an extraction means configured to extract target candidates from images in a time-series;
a first setting means configured to set a first search range based on frame information and reliability of a target in a previous image in the time-series;
a tracking means configured to search the target from the target candidates extracted within the first search range using the reliability indicating similarity to a target model and track the target;
a second setting means configured to set a second search range which includes the first search range and which is larger than the first search range; and
a model updating means configured to update the target model using the target candidates extracted within the first search range and the target candidates extracted within the second search range.

According to another example aspect of the present invention, there is provided an object tracking method comprising:
extracting target candidates from images in a time-series;
setting a first search range based on frame information and reliability of a target in a previous image in the time-series;
searching the target from the target candidates extracted within the first search range using the reliability indicating similarity to a target model and tracking the target;
setting a second search range which includes the first search range and which is larger than the first search range; and
updating the target model using the target candidates extracted within the first search range and the target candidates extracted within the second search range.

According to still another example aspect of the present invention, there is provided a recording medium recording a program, the program causing a computer to execute:
extracting target candidates from image in a time-series;
setting a first search range based on frame information and reliability of a target in a previous image in the time-series;
searching the target from the target candidates extracted within the first search range using the reliability indicating similarity to a target model and tracking the target;
setting a second search range which includes the first search range and which is larger than the first search range; and
updating the target model using the target candidates extracted within the first search range and the target candidates extracted with in the second search range.

Effect of the Invention

According to the present invention, it is possible to prevent transfer in object tracking.

EXAMPLE EMBODIMENTS

Preferred example embodiments of the present invention will be described with reference to the accompanying drawings.

First Example Embodiment

Outline of Object Tracking Device

Figure 1:
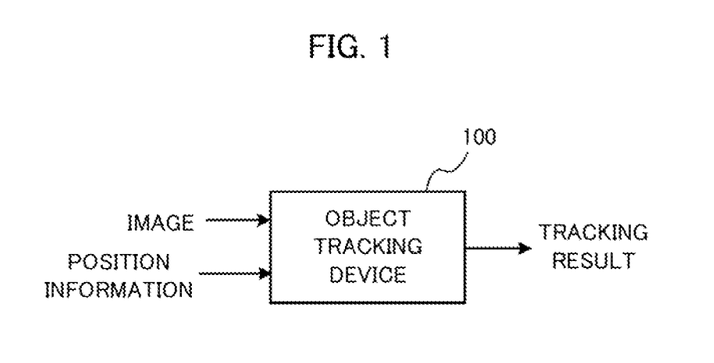
FIG. 1 shows an outline of the object tracking device according to a first example embodiment.

FIG. 1 shows an outline of an object tracking device according to a first example embodiment. To the object tracking device 100, an image including an object to be tracked (referred to as a "target") and position information indicating the position of the target in the image are inputted. Incidentally, the input image is a moving image acquired from a camera or a database, i.e., a time series image (continuous image sequence) constituting a video. The object tracking device 100 generates a target model indicating a feature of the target specified by the position in the input image, and detects and tracks an object similar to the target model in each frame image as the target. The object tracking device 100 outputs frame information indicating the position and size of a frame including the target in the input image (hereinafter, referred to as a "target frame") or an image in which the target frame is displayed on the original moving image as a tracking result.

[Hardware Configuration]

Figure 2:
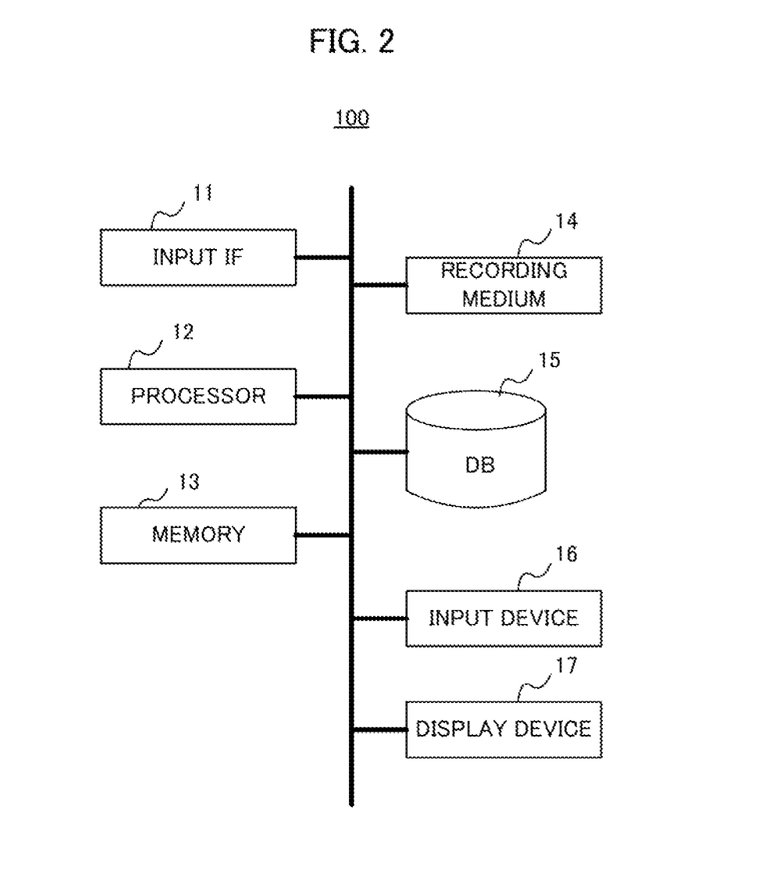
FIG. 2 is a block diagram showing a hardware configuration of the object tracking device.

FIG. 2 is a block diagram illustrating a hardware configuration of the object tracking device 100. As shown, the object tracking device 100 includes an input IF (InterFace) 11, a processor 12, a memory 13, a recording medium 14, a database (DB) 15, an input device 16, and a display device 17.

The input IF 11 inputs and outputs data. Specifically, the input IF 11 acquires an image including the target, and acquires position information indicating the initial position of the target in the image.

The processor 12 is a computer such as a CPU (Central Processing Unit), a GPU (Graphics Processing Unit), or the like, and controls the entire object tracking device 100 by executing a program prepared in advance. Particularly, the processor 12 performs a tracking feature model generation process, a target model generation process, and a tracking process, which will be described later.

The memory 13 is configured by a ROM (Read Only Memory), RAM (Random Access Memory), or the like. The memory 13 stores various programs to be executed by the processor 12. The memory 13 is also used as a work memory during the execution of various processes by the processor 12.

The recording medium 14 is a non-volatile, non-transitory recording medium such as a disk-shaped recording medium, a semiconductor memory, or the like, and is detachably configured with respect to the object tracking device 100. The recording medium 14 records various programs executed by the processor 12.

The DB 15 stores data inputted from the input IF 11. Specifically, the DB 15 stores the images containing the targets. Also, the DB 15 stores information of the target model used in the object tracking, and the like.

The input device 16 is a keyboard, a mouse, a touch panel, or the like, and is used in making instructions and inputs required by the user in connection with the processes executed by the object tracking device 100. The display device 17 is a liquid crystal display, for example, and displays an image indicating the tracking result or the like.

Functional Configuration

Figure 3:
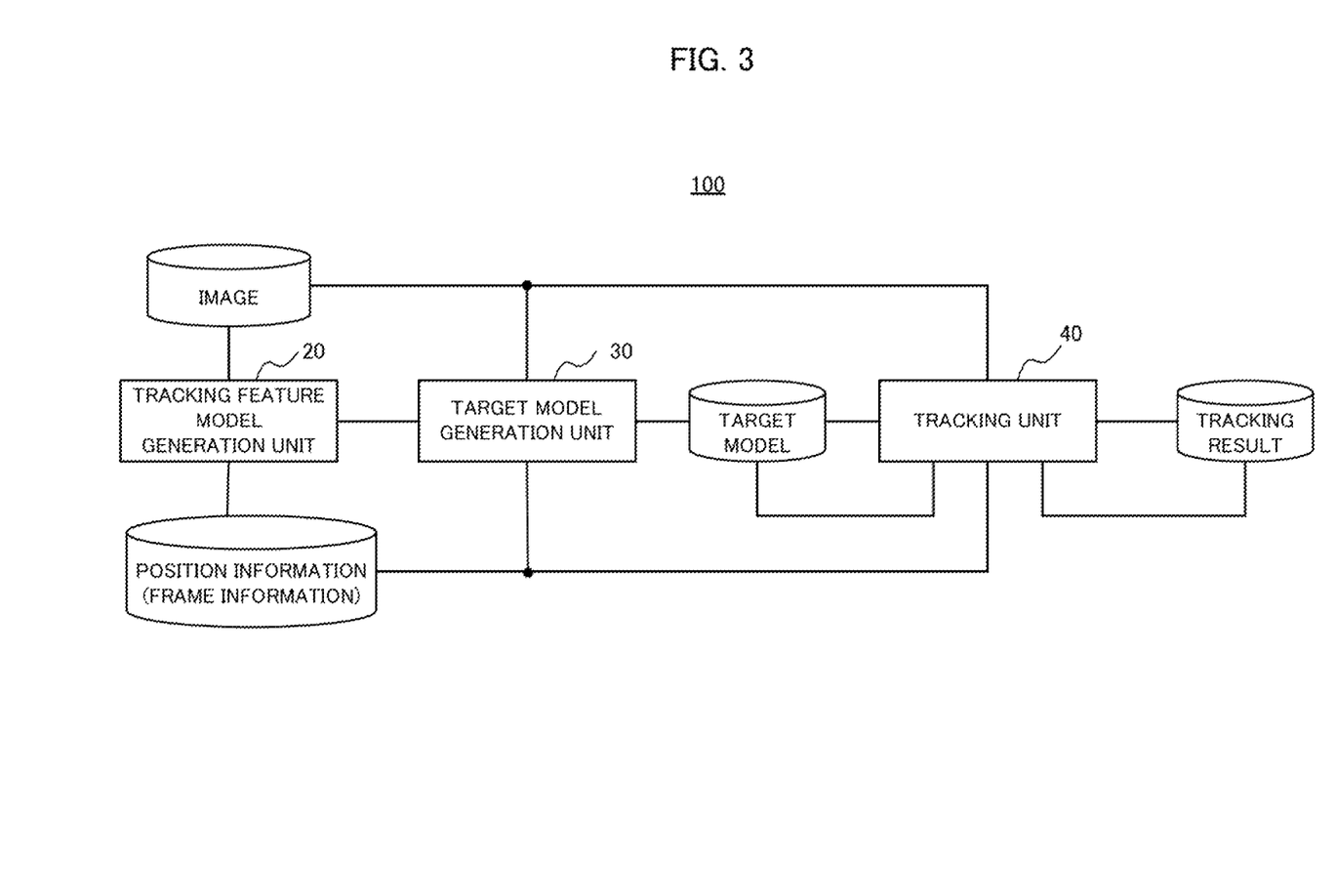
FIG. 3 is a block diagram showing a functional configuration of the object tracking device.

FIG. 3 is a block diagram illustrating a functional configuration of the object tracking device 100. The object tracking device 100 includes a tracking feature model generation unit 20, a target model generation unit 30, and a tracking unit 40. The tracking feature model generation unit 20 generates a tracking feature model based on the input image and the position information of the target in the input image, and outputs the tracking feature model to the target model generation unit 30. The target model generation unit 30 generates a target model indicating the feature of the target based on the input image, the position information of the target in the image, and the tracking feature model, and outputs the target model to the tracking unit 40. The tracking unit 40 detects the target from the input image using the target model, tracks the target, and outputs the tracking result. Also, the tracking unit 40 updates the target model based on the detected target and the objects other than the target acquired at the time of detecting the target. Each element will be described in detail below.

Figure 4:
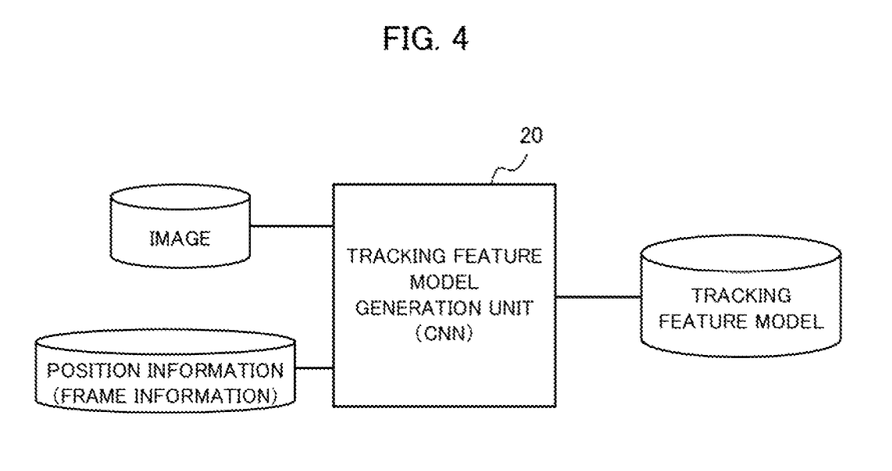
FIG. 4 shows a tracking feature model generation unit.

FIG. 4 shows a tracking feature model generation unit 20. The tracking feature model generating unit 20 generates a tracking feature model. The "tracking feature model" is a model generated beforehand by learning and indicating the features which should be noticed in the tracking of the target. In the present example embodiment, the tracking feature model generation unit 20 is configured by a feature extractor such as a CNN (Convolutional Neural Network). The tracking feature model generation unit 20 learns the basic features of the target object and generates the tracking feature model. For example, when the target of tracking is "a specific person", the tracking feature model generation unit 20 learns the features of a general "person (human)" using the input image.

In the above example, together with the input image, the position information indicating the position of the person in the image is inputted to the tracking feature model generation unit 20. For example, the position information of the area of the person is inputted by the user who operates the input device 16 to designate a frame surrounding the person in the image displayed on the display device 17. Alternatively, an object detector for detecting a person from the input image may be provided in the front stage, and the position of the person detected by the object detector may be inputted to the tracking feature model generation unit 20 as the position information. The tracking feature model generation unit 20 learns the tracking feature model using the object in the area of the input image indicated by the position information as a positive example ("person") and using other objects as negative examples ("other than person"), and outputs the learned tracking feature model.

In the above-described example embodiment, the tracking feature model is learned using the deep learning by the CNN. However, the tracking feature model may be generated by various other feature extraction methods. Additionally, at the time of generating the tracking feature model, not only the same object in the images at continuous times (e.g., time t and time t+1), but the same object in the images at more distant times (e.g., time t and time t+10) may be used for learning. Thus, the target can be extracted accurately even when the appearance of the object is greatly deformed.

Further, other than the frame surrounding the target as described above, the position information inputted to the tracking feature model generation unit 20 may be the center position of the target, the segmentation information of the target, or the like.

Figure 5:
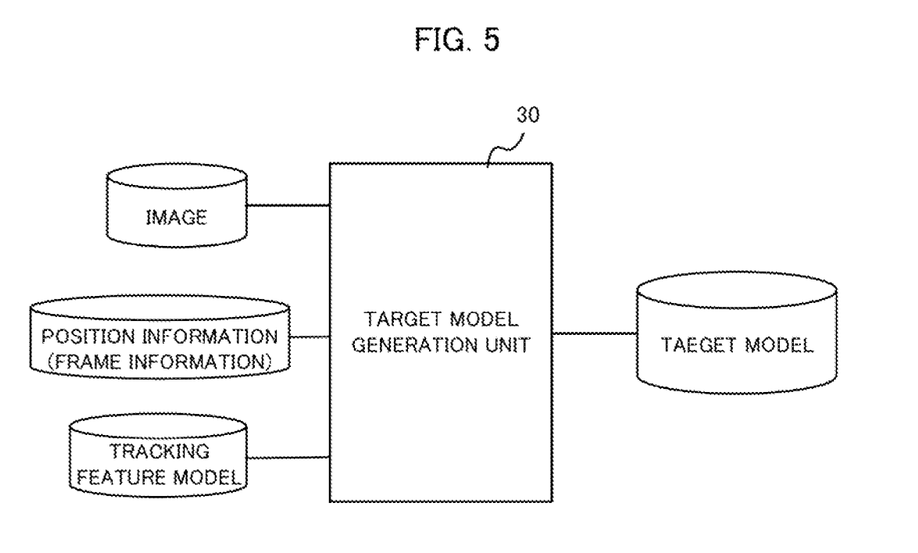
FIG. 5 shows a target model generation unit.

FIG. 5 shows a target model generation unit 30. The target model generation unit 30 updates the tracking feature model using the image features of the target in the input image to generate the target model. To the target model generation unit 30, the moving image including a plurality of frame images is inputted as an input image. Further, the frame information of the target in the above input image is inputted to the target model generation unit 30. Incidentally, the frame information is information indicating the size and position of the target frame surrounding the target. Further, the tracking feature model generated by the tracking feature model generation unit 20 is inputted to the target model generation unit 30.

The target model is a model which represents the image feature to be noticed to track the target. Here, the aforementioned tracking feature model is a model representing the basic feature of the target object, whereas the target model is a model representing the individual feature of the object to be tracked. For example, if the tracking target is a "specific person", the target model is a model representing the feature of the specific person designated by the user in the input image. Namely, the generated target model includes the feature specific to the specific person designated by the user in the input image.

The target model generation unit 30 includes a feature extractor such as a CNN, and extracts image feature of the target from an area of the target frame in the input image. Then, the target model generation unit 30 uses the image feature of the extracted target and the tracking feature model to generate the target model representing the feature to be noticed in order to track the specific target. Incidentally, in addition to the image feature of the tracking feature model, the target model includes information such as the size and aspect ratio of the target as well as movement information including the moving direction, the moving amount, the moving speed, and the like of the target. The target model generation unit 30 outputs the generated target model to the tracking unit 40.

Figure 6:
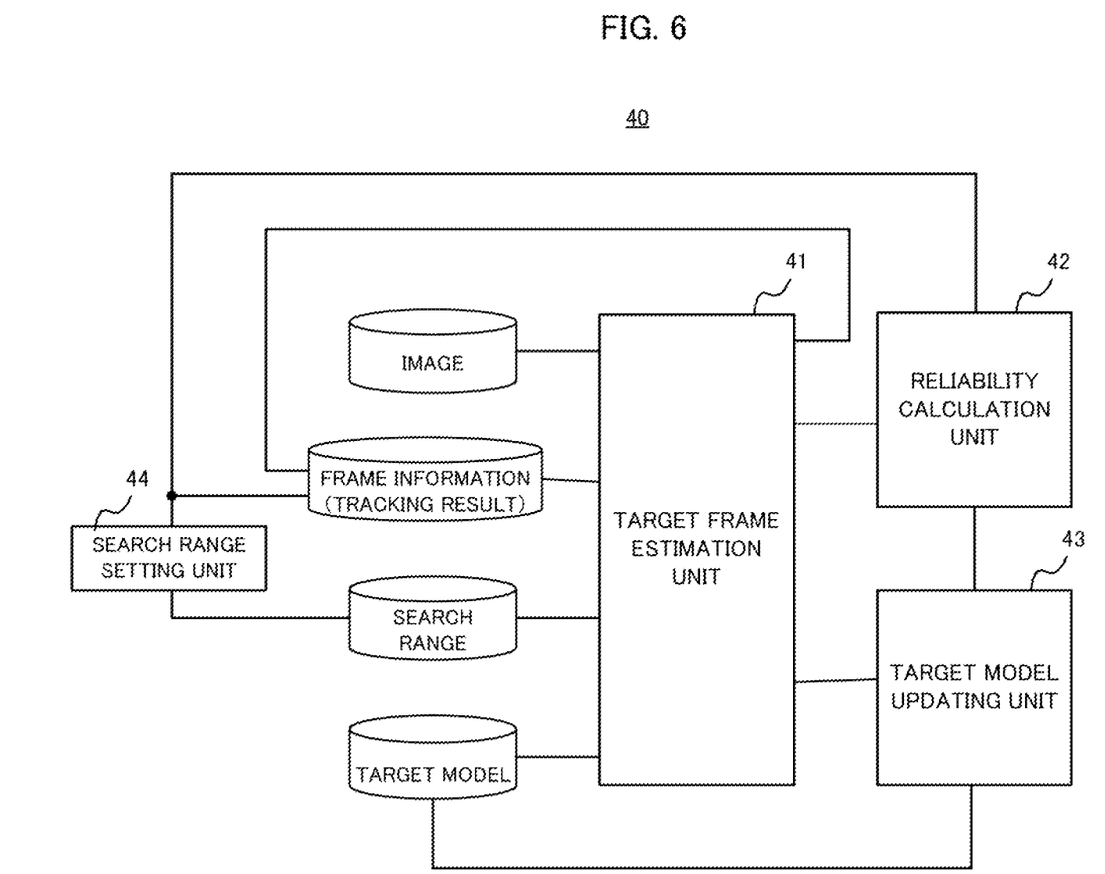
FIG. 6 is a block diagram showing a configuration of a tracking unit.

FIG. 6 is a block diagram showing the configuration of the tracking unit 40. The tracking unit 40 detects and tracks the target in the input image and updates the target model using the information of the objects obtained at the time of detecting the target. The tracking unit 40 includes a target frame estimation unit 41, a reliability calculation unit 42, a target model updating unit 43, and a search range setting unit 44.

First, the frame information is inputted to the search range setting unit 44. This frame information includes the frame information and the reliability of the target obtained as the tracking result in the previous frame image. The search range setting unit 44 sets the target search range based on the inputted frame information. The target search range is the range predicted to include the target in the frame image, and is set around the target frame in the previous frame image.

Figure 7:
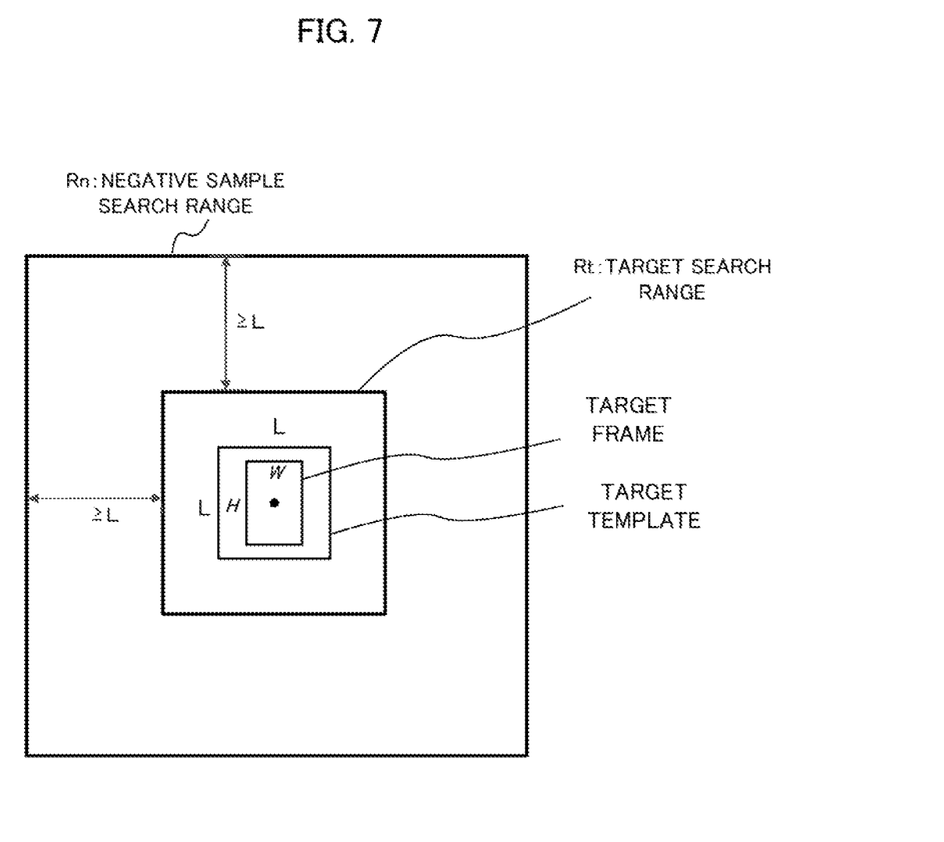
FIG. 7 shows a method of setting a search range.

FIG. 7 shows a method of setting the search range. In the example of FIG. 7, the frame information of the target frame, which is a rectangle of the vertical length H and the horizontal length W, is inputted to the search range setting unit 44. Basically, the search range setting unit 44 forms a target template including the target frame indicated by the inputted frame information, and sets a target search range Rt having a size twice as large as the target template in both the height and width. Also, the search range setting unit 44 modifies the target search range Rt according to the reliability of the target frame obtained as the tracking result in the previous frame image. First, the search range setting unit 44 modifies the target search range Rt according to the reliability of the target frame. Specifically, when the reliability of the target frame is low, the target search range is expanded. Further, the search range setting unit 44 may modify the target search range Rt according to the size of the target frame. For example, the search range setting unit 44 expands the target search range Rt when the target frame is large.

Furthermore, the search range setting unit 44 modifies the target search range Rt based on the movement information of the target, i.e., the moving direction and the moving speed, etc. For example, the search range setting unit 44 modifies the target search range Rt to be wide in the moving direction of the target and narrow in the direction opposite thereto. Further, the search range setting unit 44 may increase the amount of expansion in the moving direction, as the moving speed of the target is fast. Although the expansion of the target search range Rt with respect to the target template is twice in both the vertical and horizontal directions in the above example, the target search range Rt may be modified by performing weighting according to the moving speed in the moving direction of the target. For example, the target search range Rt may be expanded in the moving direction of the target by giving a large weight to the expansion degree of the target search range Rt, and the target search range Rt may be reduced in the direction opposite to the moving direction of the target by giving a small weight to the expansion degree. Incidentally, the movement information of the target is calculated based on the position of the target frame in each frame image at present and in the past.

Further, when the target is being successively tracked (hereinafter referred to as "tracking state"), the search range setting unit 44 sets the target search range Rt by the above method. However, when the target is not being tracked (hereinafter also referred to as "lost state"), the search range setting unit 44 expands the target search range Rt to detect and track the target again. For example, the search range setting unit 44 sets the target search range Rt to be twice the target template in the vertical and horizontal dimensions in the tracking state, and sets the target search range Rt to be six times the target template in the vertical and horizontal dimensions in the lost state. Further, the search range setting unit 44 may expand the target search range Rt as the lost state continues long. Incidentally, the search range setting unit 44 determines whether or not the target is being successively tracked (this will be hereinafter referred to as "lost determination") based on the reliability of the target frame obtained in the previous frame image. Specifically, the search range setting unit 44 determines the lost state when the reliability of the target frame is lower than a predetermined value (e.g., 0.8). Thereafter, when the reliability of the target frame exceeds a predetermined value (e.g., 0.9), the search range setting unit 44 determines that the target is detected again and returns the target search range Rt to the size of the tracking state.

Also, the search range setting unit 44 sets the negative sample search range based on the target search range Rt set as described above. "Negative sample" refers to an object of the target candidate that is detected from the input image and is different from the target. The negative sample is learned as a negative example in updating the target model. In the present example embodiment, in order to prevent the aforementioned transfer of target, an object that is likely to cause transfer in the frame image at or after the next time is detected as a negative sample in advance, and the target model is updated using the negative example. Thus, even if the negative sample enters the target search range Rt in the frame image at or after the next time, the similarity of the negative sample with the target model is reduced. Therefore, the probability of mistakenly determining the negative sample as the target is reduced, and it becomes possible to prevent the occurrence of transfer. For this purpose, the negative sample search range is set outside the target search range Rt in this example embodiment. Namely, the "negative sample search range" refers to a range set to extract the negative sample corresponding to the object other than the target from the input image.

FIG. 7 shows an example of a negative sample search range. The negative sample search range Rn is basically set to include the target search range Rt. Also, the negative sample search range Rn is larger than the target search range Rt by one target, specifically by one or more target templates. In the example of FIG. 7, since the length of one side of the target template is "L", the negative sample search range Rn is larger than the target search range Rt by the length L or more in all directions. This is to detect the object similar to the target and entered the negative sample search range Rn as the negative sample. Namely, in order to detect the object similar to the target as the negative sample, the negative sample search range Rn is determined to have a space to accommodate the similar object having the same size as the target.

If the negative sample search range Rn is made too large, the processing load for extracting the negative sample within the range and the subsequent update processing of the target model becomes large. Therefore, it is preferable that the negative sample search range Rn is larger than the target search range Rt by a size of one target plus a predetermined margin. It is noted that, in the lost state, the search range setting unit 44 expands the target search range Rt and sets the negative sample search range Rn outside the expanded target search range Rt.

When the target search range Rt and the negative sample search range Rn are thus set, the tracking unit 40 detects and tracks the target from the input image. First, the target frame estimation unit 41 estimates the target frame using the target model within the target search range Rt of the input image. Specifically, the target frame estimation unit 41 detects tracking candidate windows indicating a candidate of the target within the target search range Rt, and the reliability calculation unit 42 compares the image feature of each tracking candidate windows with the target model to calculate the reliability. As the tracking candidate window, for example, RP (Region Proposal) obtained by using a RPN (Region Proposal Network) or the like can be used. The tracking candidate frame is an example of a target candidate. Also, "reliability" is a degree of similarity with the target model. Then, the target frame estimation unit 41 determines the tracking candidate window having the highest reliability, from among the plurality of tracking candidate windows, as the tracking result for the image, i.e. the target. The frame information of this target is used in the processing of the next frame image.

Further, the target model updating unit 43 determines whether or not the reliability of the target frame thus obtained belongs to the first value range for the positive sample, e.g., 0.6<P<0.8. When the reliability of the target frame belongs to the first value range, the target model updating unit 43 updates the target model using the tracking candidate window as the positive sample. Specifically, the target model updating unit 43 updates the target model by multiplying the target model by the image feature map obtained from the positive sample. When the reliability of the target frame does not belong to the first value range, the target model updating unit 43 does not update the target model using the tracking candidate frame.

Further, the target frame estimation unit 41 detects the tracking candidate windows indicating the candidate of the target within the negative sample search range Rn, and the reliability calculation unit 42 compares the image feature of each tracking candidate window with the target model to calculate the reliability. Then, the target model updating unit 43 extracts the tracking candidate windows having the reliability belonging to the second value range, e.g., 0.3<N<0.7, from among the plurality of tracking candidate windows detected within the negative sample search range Rn, and determines some of them as the negative samples. It is noted that the second value range for the negative sample and the first value range for the positive sample are set to partially overlap with each other. This makes it possible to update the target model by learning subtle objects, for which the determination of whether they are positive samples or negative samples is difficult, in consideration of both possibilities.

Specifically, from the plurality of tracking candidate windows detected within the negative sample search range Rn, the target model updating unit 43 selects the tracking candidate windows which are other than the target frame, whose reliabilities belong to the second value range and whose overlaps with the target frame are equal to or smaller than a certain value. Then, the target model updating unit 43 performs NMS (Non-Maximum Suppression) for the selected tracking candidate windows to determine the negative samples. If necessary, the target model updating unit 43 selects a certain number of tracking candidate windows obtained by the NMS as the negative samples. Then, the target model updating unit 43 updates the target model using the obtained negative samples. Specifically, the target model updating unit 43 updates the target model by multiplying the target model by the image feature map obtained from the negative samples.

In the above configuration, the target frame estimation unit 41 is an example of the extraction means and the tracking means. The search range setting unit 44 is an example of the first setting means and the second setting means. The target model updating unit 43 is an example of the model updating means, the first extraction means, and the second extraction means. Also, the positive sample search range is an example of the first search range, and the negative sample search range is an example of the second search range.

Processes by Object Tracking Device

Next, each process performed by the object tracking device 100 will be described. The object tracking device 100 performs a tracking feature model generation process, a target model generation process, and a tracking process, which will be described below in order.

Tracking Feature Model Generation Process

Figure 8:
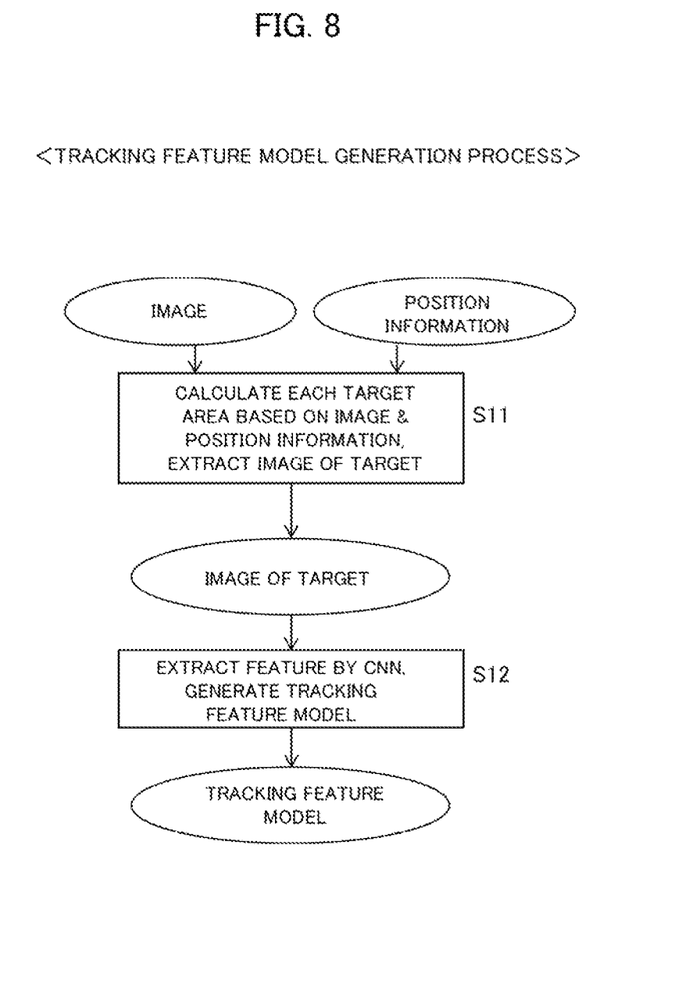
FIG. 8 is a flowchart of a tracking feature model generation process.

The tracking feature model generation process is executed by the tracking feature model generation unit 20 to generate the tracking feature model from the input image and the position information of the target. FIG. 8 is a flowchart of the tracking feature model generation process. This process is implemented by the processor 12 shown in FIG. 2, which executes a program prepared in advance.

First, the tracking feature model generation unit 20 calculates a target area in the input image based on the input image and the position information of the target in the input image and extracts an image of the target (step S11). Next, the tracking feature model generation unit 20 extracts the feature from the image of the target by CNN and generates the tracking feature model (step S12). Thus, a tracking feature model that represents the feature of the target is generated.

In the tracking feature model generation process, in order to track the same target in the tracking unit 40, the tracking feature model is generated on the supposition that the target in the time series image is the same. Also, in order to prevent transfer, the tracking feature model is generated on the supposition that the target and the others are different. Also, in order to recognize the target by more detailed image features, the tracking feature model is generated such that the objects of different type in the same category, such as a bike and a bicycle, or the same objects of different colors, are regarded as different objects.

Target Model Generation Process

Figure 9:
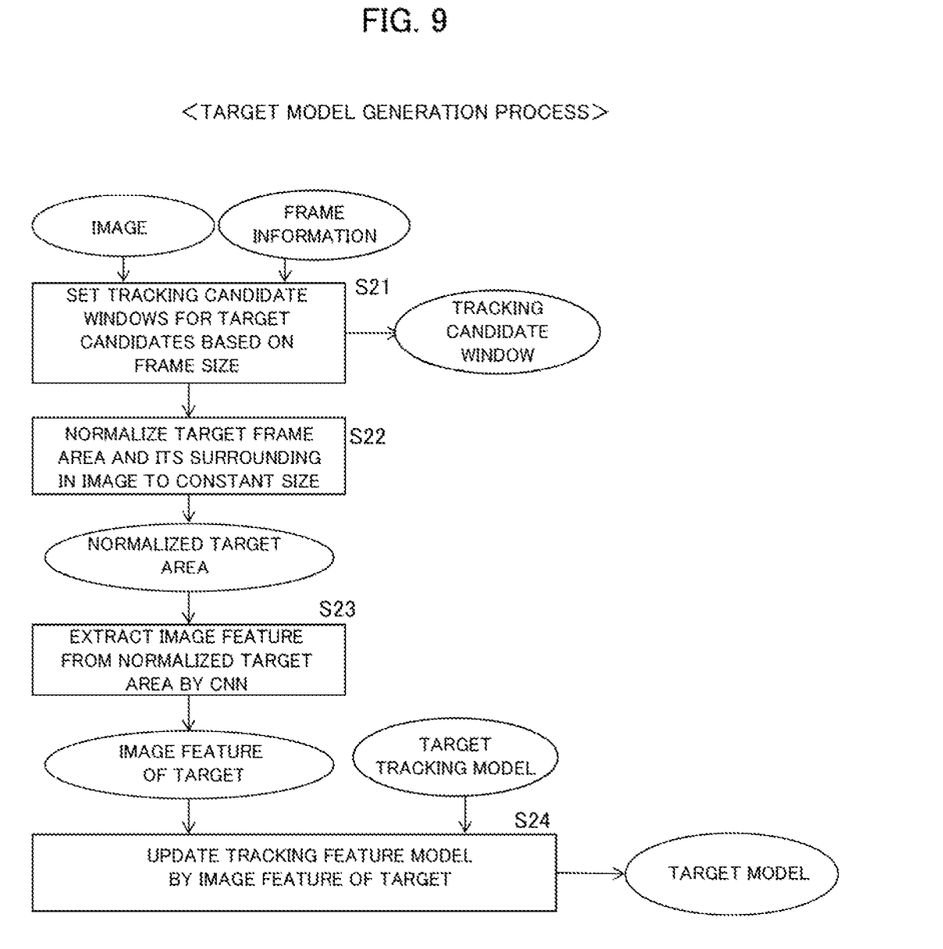
FIG. 9 is a flowchart of a target model generation process.

Following the tracking feature model generation process, the target model generation process is executed. The target model generation process is executed by the target model generation unit 30 to generate the target model based on the input image, the frame information of the target in the input image, and the tracking feature model. FIG. 9 is a flowchart of the target model generation process. This process is implemented by the processor 12 shown in FIG. 2, which executes a program prepared in advance.

First, the target model generation unit 30 sets the tracking candidate windows serving as the target candidates, based on the size of the frame indicated by the frame information (step S21). The tracking candidate window is a window used for searching a target in the tracking process to be described later, and is set to the same size as the size of the target frame indicated by the frame information.

Next, the target model generation unit 30 normalizes the area in the target frame and its periphery in the input image to a constant size to generate a normalized target area (step S22). This is the process to match the area of the target frame to a size suitable for the input of CNN as a preprocessing of CNN. Next, the target model generation unit 30 extracts the image feature from the normalized target area using the CNN (step S23).

Then, the target model generation unit 30 updates the tracking feature model generated by the tracking feature model generation unit 20 with the image feature of the target and generates the target model (step S24). While the image feature is extracted from the target area indicated by the target frame using the CNN in this example, other methods may be used to extract the image feature. Also, the target model may be represented by one or more feature spaces by performing feature extraction by CNN, for example. In this case, the ratio of the image feature of the target and the image feature of the negative sample may be adjusted or weighted according to the elapsed time or the reliability.

Tracking Process

Figure 10:
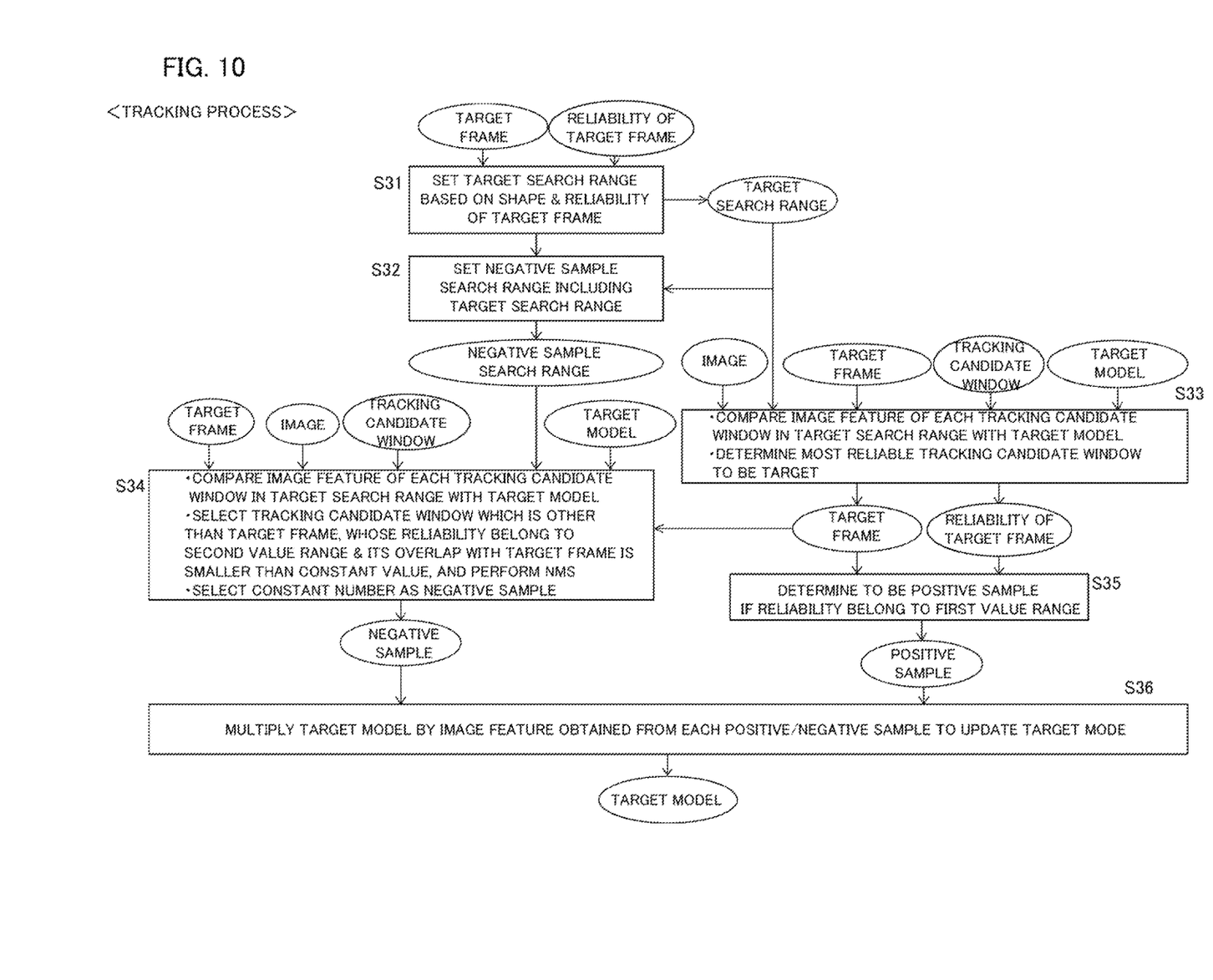
FIG. 10 is a flow chart of a tracking process.

Following the target model generation process, the tracking process is executed. The tracking process is performed by the tracking unit 40 to track the target in the input image and update the target model. FIG. 10 is a flowchart of the tracking process. This process is implemented by the processor 12 shown in FIG. 2, which executes a program prepared in advance and operates as each element shown in FIG. 6.

First, the search range setting unit 44 sets the target search range based on the shape and reliability of the target frame in the previous frame image (step S31). At the start of the process, i.e., in the first frame image, the position of the target inputted in the tracking feature model generation process is used as the target frame, and "1.0" is used as the reliability of the target frame.

Next, the search range setting unit 44 sets the negative sample search range including the target search range based on the set target search range (step S32). Specifically, the search range setting unit 44 sets the negative sample search range by the method described with reference to FIG. 7.

Next, the target frame estimation unit 41 extracts a plurality of tracking candidate windows belonging to the set target search range. Also, the reliability calculation unit 42 compares the image feature of each tracking candidate window with the target model and calculates the reliability of each tracking candidate window. Then, the target frame estimation unit 41 determines the most reliable tracking candidate window from among the tracking candidate windows as the target frame in the image (step S33). In this way, the target is tracked.

Next, the target frame estimation unit 41 extracts a plurality of tracking candidate windows belonging to the set negative sample search range. Also, the reliability calculation unit 42 compares the image feature of each tracking candidate window with the target model and calculates the reliability of each tracking candidate window. Then, the target model updating unit 43 selects the tracking candidate windows which are other than the target frame, whose reliabilities belong to the second value range, and whose overlaps with the target frame are equal to or smaller than a certain value. Then, the target model updating unit 43 performs NMS, and further selects a fixed number of tracking candidate windows in consideration of the dispersion of the position from among them, and determines them to be the negative samples (step S34).

Further, when the reliability of the target frame determined in step S33 belongs to the first value range, the target model updating unit 43 determines the target frame to be the positive sample (step S35).

Then, the target model updating unit 43 updates the target model by multiplying the target model by the image features obtained from the positive sample and the negative samples (step S36). Thus, the target model is updated.

Second Example Embodiment

Figure 11:
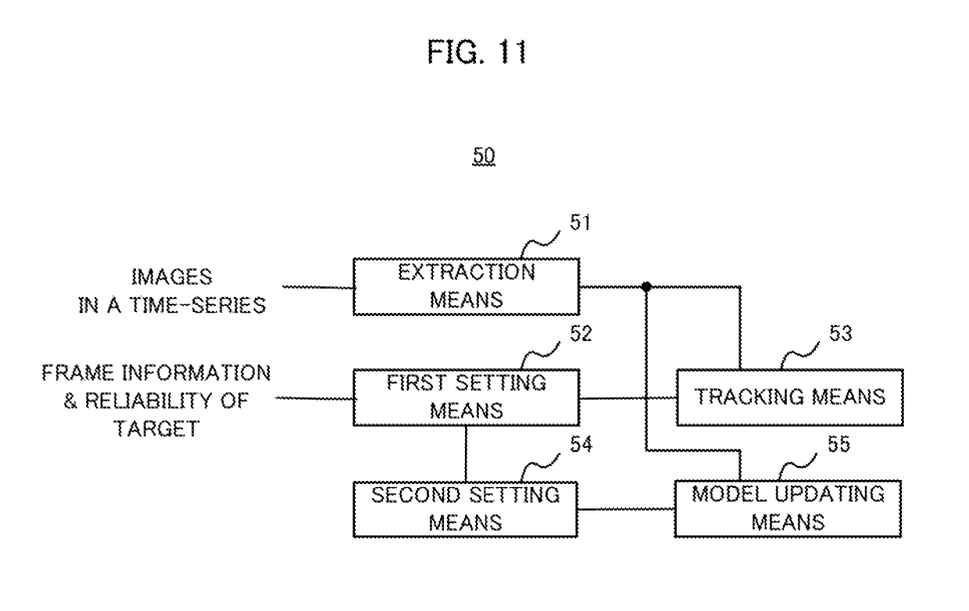
FIG. 11 is a block diagram showing a functional configuration of an object tracking device according to a second example embodiment.

FIG. 11 is a block diagram showing the functional configuration of the object tracking device 50 according to the second example embodiment. The object tracking device 50 includes an extraction means 51, a first setting means 52, a tracking means 53, a second setting means 54, and a model updating means 55. The extraction means 51 extracts target candidates from images in a time-series. The first setting means 52 sets a first search range based on frame information and reliability of a target in a previous image in the time-series. The tracking means 53 searches the target from the target candidates extracted within the first search range using the reliability indicating similarity to a target model, and tracks the target. The second setting means 54 sets a second search range which includes the first search range and which is larger than the first search range. The model updating means 55 updates the target model using the target candidates extracted within the first search range and the target candidates extracted within the second search range.

A part or all of the example embodiments described above may also be described as the following supplementary notes, but not limited thereto.

Supplementary Note 1

An object tracking device comprising:
an extraction means configured to extract target candidates from images in a time-series;
a first setting means configured to set a first search range based on frame information and reliability of a target in a previous image in the time-series;
a tracking means configured to search the target from the target candidates extracted within the first search range using the reliability indicating similarity to a target model and track the target;
a second setting means configured to set a second search range which includes the first search range and which is larger than the first search range; and
a model updating means configured to update the target model using the target candidates extracted within the first search range and the target candidates extracted within the second search range.

Supplementary Note 2

The object tracking device according to Supplementary note 1, wherein the second setting means sets the second search range to be larger than the first search range by a size equal to or larger than the target.

Supplementary Note 3

The object tracking device according to Supplementary note 1 or 2, wherein the first setting unit sets the first search range so as to include a moving destination of the target based on a moving direction and a moving speed of the target.

Supplementary Note 4

The object tracking device according to any one of Supplementary notes 1 to 3, wherein the tracking means calculates the reliability for each of the target candidates extracted within the first search range and determines the target candidate of highest reliability to be the target.

Supplementary Note 5

The object tracking device according to Supplementary note 4, wherein the tracking means calculates the reliability by weighting based on movement information of the target.

Supplementary Note 6

The object tracking device according to Supplementary note 4 or 5, further comprising:
a first extraction means configured to extract, from among the target candidates extracted within the first search range, the target candidate whose reliability belongs to a first value range as a positive sample; and
a second extraction means configured to extract, from among the target candidates extracted within the second search range, the target candidate whose reliability belongs to a second value range as a negative sample,
wherein the model updating means updates the target model using at least one of the positive sample and the negative sample.

Supplementary note 7

The object tracking device according to Supplementary note 6, wherein the first value range and the second value range are partially overlapped.

Supplementary Note 8

The object tracking device according to Supplementary note 6 or 7, wherein the second extraction means extracts, from among the target candidates extracted within the second search range, at least one of the target candidates which is other than the target, whose reliability belong to the second value range and whose overlap with the target is equal to or smaller than a constant value as the negative sample.

Supplementary Note 9

An object tracking method comprising:
extracting target candidates from images in a time-series;
setting a first search range based on frame information and reliability of a target in a previous image in the time-series;
searching the target from the target candidates extracted within the first search range using the reliability indicating similarity to a target model and tracking the target;
setting a second search range which includes the first search range and which is larger than the first search range; and
updating the target model using the target candidates extracted within the first search range and the target candidates extracted within the second search range.

Supplementary Note 10

A recording medium recording a program, the program causing a computer to execute:
extracting target candidates from image in a time-series;
setting a first search range based on frame information and reliability of a target in a previous image in the time-series;
searching the target from the target candidates extracted within the first search range using the reliability indicating similarity to a target model and tracking the target;
setting a second search range which includes the first search range and which is larger than the first search range; and
updating the target model using the target candidates extracted within the first search range and the target candidates extracted with in the second search range.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

11 Input IF
12 Processor
13 Memory
14 Recording medium
15 Database
16 Input device
17 Display device
20 Tracking feature model generation unit
30 Target model generation unit
40 Tracking unit
41 Target frame estimation unit
42 Reliability calculation unit
43 Target model updating unit
100 Object tracking device
Rt Target search range
Rn Negative sample search range

What is claimed is:

1. An object tracking device comprising:
a memory configured to store instructions; and
one or more processors configured to execute the instructions to:
extract target candidates from images in a time-series;
set a first search range based on frame information and reliability of a target in a previous image in the time-series;
search the target from the target candidates extracted within the first search range using the reliability indicating similarity to a target model and track the target;
set a second search range which includes the first search range and which is larger than the first search range; and
update the target model using the target candidates extracted within the first search range and the target candidates extracted within the second search range.

2. The object tracking device according to claim 1, wherein the one or more processors set the second search range to be larger than the first search range by a size equal to or larger than the target.

3. The object tracking device according to claim 1, wherein the one or more processors set the first search range so as to include a moving destination of the target based on a moving direction and a moving speed of the target.

4. The object tracking device according to claim 1, wherein the one or more processors calculate the reliability for each of the target candidates extracted within the first search range and determines the target candidate of highest reliability to be the target.

5. The object tracking device according to claim 4, wherein the one or more processors calculate the reliability by weighting based on movement information of the target.

6. The object tracking device according to claim 4, wherein the one or more processors are further configured to execute the instructions to:
extract, from among the target candidates extracted within the first search range, the target candidate whose reliability belongs to a first value range as a positive sample; and
extract, from among the target candidates extracted within the second search range, the target candidate whose reliability belongs to a second value range as a negative sample, and
wherein the one or more processors update the target model using at least one of the positive sample and the negative sample.

7. The object tracking device according to claim 6, wherein the first value range and the second value range are partially overlapped.

8. The object tracking device according to claim 6, wherein the one or more processors extract, from among the target candidates extracted within the second search range, at least one of the target candidates which is other than the target, whose reliability belong to the second value range and whose overlap with the target is equal to or smaller than a constant value as the negative sample.

9. An object tracking method comprising:
extracting target candidates from images in a time-series;
setting a first search range based on frame information and reliability of a target in a previous image in the time-series;
searching the target from the target candidates extracted within the first search range using the reliability indicating similarity to a target model and tracking the target;
setting a second search range which includes the first search range and which is larger than the first search range; and
updating the target model using the target candidates extracted within the first search range and the target candidates extracted within the second search range.

10. A non-transitory computer-readable recording medium recording a program, the program causing a computer to execute:
extracting target candidates from image in a time-series;
setting a first search range based on frame information and reliability of a target in a previous image in the time-series;
searching the target from the target candidates extracted within the first search range using the reliability indicating similarity to a target model and tracking the target;
setting a second search range which includes the first search range and which is larger than the first search range; and
updating the target model using the target candidates extracted within the first search range and the target candidates extracted with in the second search range.

* * * * *